US012603692B2

(12) United States Patent
Guo

(10) Patent No.: US 12,603,692 B2
(45) Date of Patent: Apr. 14, 2026

(54) METHODS AND APPARATUS FOR BEAM DETERMINATION FOR PHYSICAL UPLINK CONTROL CHANNEL (PUCCH) TRANSMISSION

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 500 days.

(21) Appl. No.: 18/146,971

(22) Filed: Dec. 27, 2022

(65) Prior Publication Data

US 2023/0135408 A1     May 4, 2023

Related U.S. Application Data

(63) Continuation of application No. PCT/IB2021/059944, filed on Oct. 27, 2021.

(Continued)

(51) Int. Cl.
| *H04B 7/06* | (2006.01) |
| *H04W 52/32* | (2009.01) |

(Continued)

(52) U.S. Cl.
CPC ...... *H04B 7/06964* (2023.05); *H04W 52/325* (2013.01); *H04W 72/20* (2023.01);
(Continued)

(58) Field of Classification Search
None
See application file for complete search history.

(56) References Cited

U.S. PATENT DOCUMENTS 11,589,394 B2 * 2/2023 Pezeshki ........... H04W 74/0833
2018/0234960 A1    8/2018 Nagaraja et al.
(Continued)

FOREIGN PATENT DOCUMENTS

| CN | 109997398 A | 7/2019 |
| CN | 111818641 A | 10/2020 |

(Continued)

OTHER PUBLICATIONS

NTT Docomo et al: "Updated proposal of PUCCH spatial relation after CBRA-BFR in Rel. 16", 3GPP Draft; R1-2008536, 3rd Generation Partnership Project (3GPP), Mobilecompetence Centre ; 650, Route Des Lucioles ; F-06921 Sophia-Antipolis Cedex; France vol. RAN WGI, No. e-Meeting; Oct. 26, 2020-Nov. 13, 2020, Nov. 1, 2020 (Nov. 1, 2020), XP052350466, the whole document, 5 pages.

(Continued)

*Primary Examiner* — Srinivasa R Reddivalam
(74) *Attorney, Agent, or Firm* — PERKINS COIE LLP

(57) ABSTRACT

Methods and systems for starting a contention-based random-access channel (RACH) upon detecting beam failure of a serving cell. The method includes transmitting a medium access control (MAC) control element (CE), signaling the beam failure of the serving cell in a message of the contention-based RACH. The method further includes determining completion of the contention-based RACH based on receipt of a physical downlink control channel (PDCCH); and after receiving one or more of the last symbols of the PDCCH, determining a default transmission (Tx) beam for each resource of a physical uplink control channel (PUCCH) that includes a PUCCH spatial relation information parameter.

20 Claims, 4 Drawing Sheets

200

201
Upon detecting beam failure of a serving cell, starting a contention-based random-access channel (RACH)

203
Transmitting a medium access control (MAC) control element (CE), and the MAC CE signals the beam failure of the serving cell in a message of the contention-based RACH 205
Determining completion of the contention-based RACH based on receipt of a physical downlink control channel (PDCCH)

207
After receiving one or more of the last symbols of the PDCCH, determining a default transmission beam for each resource of a physical uplink control channel (PUCCH) that includes a PUUCH spatial relation information parameter

Related U.S. Application Data

(60) Provisional application No. 63/108,500, filed on Nov. 2, 2020.

(51) Int. Cl.

| | | |
|---|---|---|
| *H04W 72/20* | (2023.01) | |
| *H04W 72/231* | (2023.01) | |
| *H04W 74/0833* | (2024.01) | |
| *H04W 74/0836* | (2024.01) | |

(52) U.S. Cl.
CPC ..... *H04W 72/231* (2023.01); *H04W 74/0833* (2013.01); *H04W 74/0836* (2024.01)

(56) References Cited

U.S. PATENT DOCUMENTS

| | | | | |
|---|---|---|---|---|
| 2019/0124640 | A1 | 4/2019 | Nagaraja et al. | |
| 2019/0141691 | A1 | 5/2019 | Kwon et al. | |
| 2019/0190582 | A1* | 6/2019 | Guo ..................... | H04B 17/327 |
| 2020/0374853 | A1* | 11/2020 | Guan .................... | H04W 24/08 |
| 2021/0307076 | A1 | 9/2021 | Matsumura et al. | |
| 2021/0314053 | A1 | 10/2021 | Matsumura et al. | |
| 2021/0320710 | A1* | 10/2021 | Koskela ................. | H04B 7/088 |
| 2023/0146642 | A1* | 5/2023 | Matsumura ........ | H04B 7/06964 |
| | | | | 370/216 |
| 2023/0254928 | A1* | 8/2023 | Matsumura ........... | H04W 76/19 |
| | | | | 370/225 |
| 2023/0262632 | A1* | 8/2023 | Liu ....................... | H04W 72/23 |
| | | | | 370/503 |

FOREIGN PATENT DOCUMENTS

| | | |
|---|---|---|
| WO | 2020026455 A | 2/2020 |
| WO | 2020031343 A1 | 2/2020 |

OTHER PUBLICATIONS

Supplementary European Search Report in the European application No. 21885477.6, mailed on Feb. 15, 2024, 7 pages.

International Search Report in the international application No. PCT/IB2021/059944, mailed on Feb. 8, 2022—3 pages.

Written Opinion of the International Search Authority in the international application No. PCT/IB2021/059944, mailed on Feb. 8, 2022—4 pages.

3GPP TS 38.211 V16.2.0, "3rd Generation Partnership Project; Technical Specification Group Radio Access Network; NR; Physical channels and modulation (Release 16)", Technical Specification, (Jun. 2020)—126 pages.

3GPP TS 38.212 V16.2.0, "3rd Generation Partnership Project; Technical Specification Group Radio Access Network; NR; Multiplexing and channel coding (Release 16)", Technical Specification, (Jun. 2020)—146 pages.

3GPP TS 38.213 V16.2.0, "3rd Generation Partnership Project; Technical Specification Group Radio Access Network; NR; Physical layer procedures for control (Release 16)", Technical Specification, (Jun. 2020)—176 pages.

3GPP TS 38.214 V16.2.0, "3rd Generation Partnership Project; Technical Specification Group Radio Access Network; NR; Physical layer procedures for data (Release 16)", Technical Specification, (Jun. 2020)—163 pages.

3GPP TS 38.211 V16.3.0, "3rd Generation Partnership Project; Technical Specification Group Radio Access Network; NR; Physical channels and modulation (Release 16)", Technical Specification, (Sep. 2020)—128 pages.

3GPP TS 38.212 V16.3.0, "3rd Generation Partnership Project; Technical Specification Group Radio Access Network; NR; Multiplexing and channel coding (Release 16)", Technical Specification, (Sep. 2020)—147 pages.

3GPP TS 38.213 V16.3.0, "3rd Generation Partnership Project; Technical Specification Group Radio Access Network; NR; Physical layer procedures for control (Release 16)", Technical Specification, (Sep. 2020)—179 pages.

3GPP TS 38.214 V16.3.0, "3rd Generation Partnership Project; Technical Specification Group Radio Access Network; NR; Physical layer procedures for data (Release 16)", Technical Specification, (Sep. 2020)—.165 pages.

3GPP TS 38.215 V16.3.0, "3rd Generation Partnership Project; Technical Specification Group Radio Access Network; NR; Physical layer measurements (Release 16)", Technical Specification, (Sep. 2020)—24 pages.

3GPP TS 38.321 V16.3.0, "3rd Generation Partnership Project; Technical Specification Group Radio Access Network; NR; Medium Access Control (MAC) protocol specification (Release 16)", Technical Specification, (Dec. 2020)—155 pages.

3GPP TS 38.331 V16.3.0, "3rd Generation Partnership Project; Technical Specification Group Radio Access Network; NR; Radio Resource Control (RRC) protocol specification (Release 16)", Technical Specification, (Dec. 2020)—929 pages.

First Office Action of the European application No. 21885477.6, issued on Aug. 12, 2025.

* cited by examiner

100

105

103

101

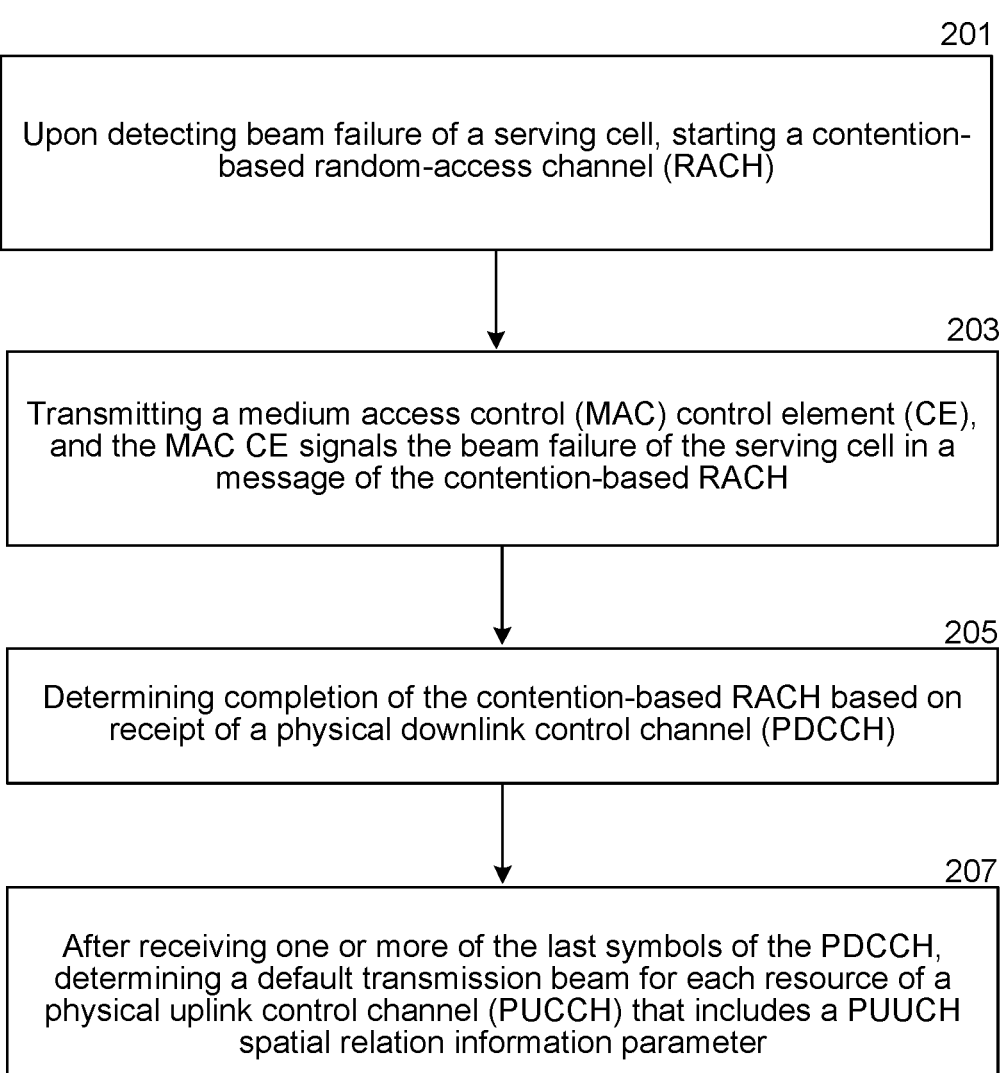

200

201

Upon detecting beam failure of a serving cell, starting a contention-based random-access channel (RACH)

203

Transmitting a medium access control (MAC) control element (CE), and the MAC CE signals the beam failure of the serving cell in a message of the contention-based RACH

205

Determining completion of the contention-based RACH based on receipt of a physical downlink control channel (PDCCH)

207

After receiving one or more of the last symbols of the PDCCH, determining a default transmission beam for each resource of a physical uplink control channel (PUCCH) that includes a PUUCH spatial relation information parameter

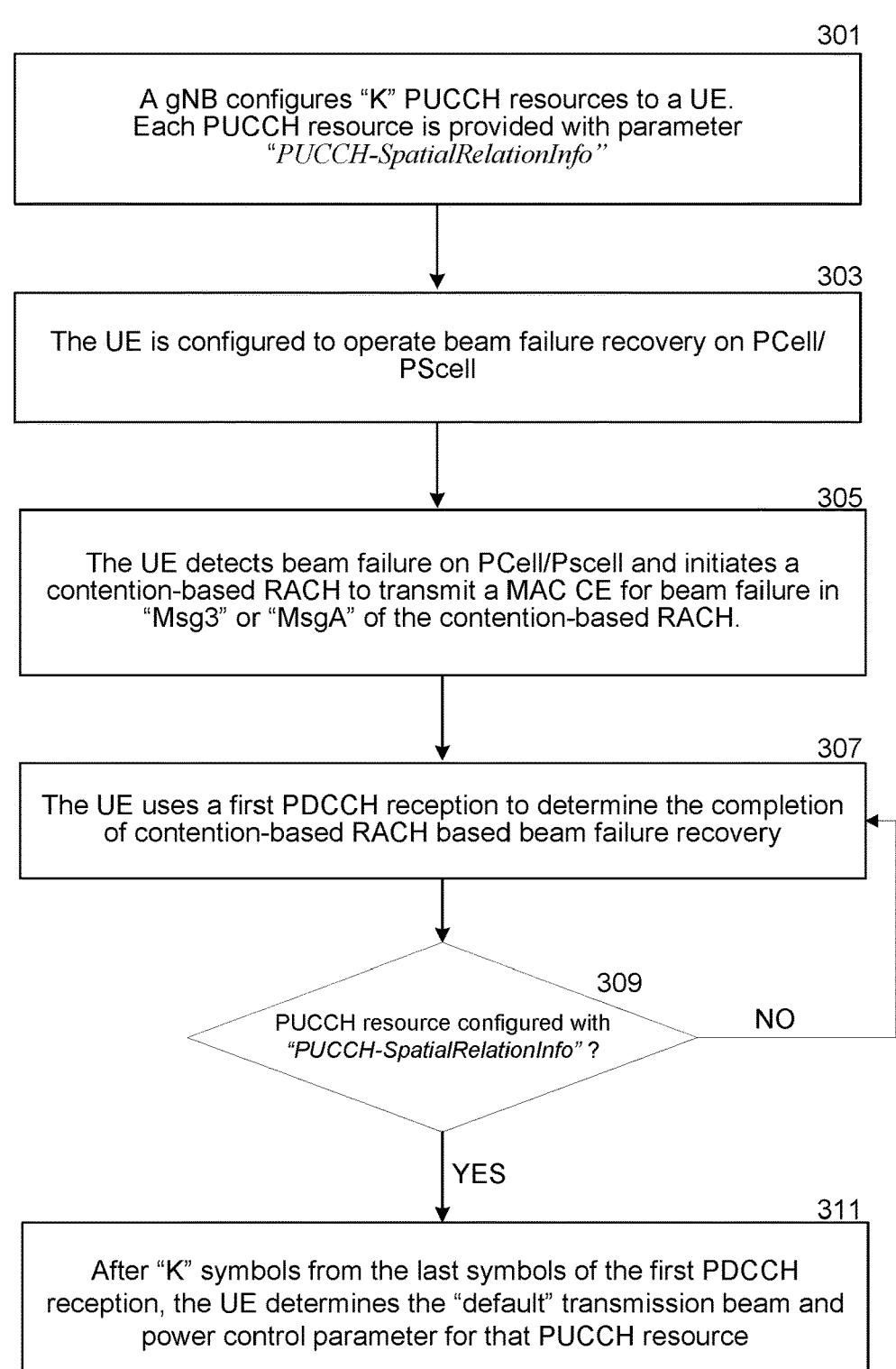

301

A gNB configures "K" PUCCH resources to a UE.
Each PUCCH resource is provided with parameter
*"PUCCH-SpatialRelationInfo"*

303

The UE is configured to operate beam failure recovery on PCell/
PScell

305

The UE detects beam failure on PCell/Pscell and initiates a
contention-based RACH to transmit a MAC CE for beam failure in
"Msg3" or "MsgA" of the contention-based RACH.

307

The UE uses a first PDCCH reception to determine the completion
of contention-based RACH based beam failure recovery

309

PUCCH resource configured with
*"PUCCH-SpatialRelationInfo"* ?

NO

YES

311

After "K" symbols from the last symbols of the first PDCCH
reception, the UE determines the "default" transmission beam and
power control parameter for that PUCCH resource

*FIG. 3*

METHODS AND APPARATUS FOR BEAM DETERMINATION FOR PHYSICAL UPLINK CONTROL CHANNEL (PUCCH) TRANSMISSION

CROSS-REFERENCE TO RELATED APPLICATION(S)

This is a continuation application of International Patent Application No. PCT/IB2021/059944, filed on Oct. 27, 2021, which claims the benefit of U.S. Provisional Patent Application Ser. No. 63/108,500, filed Nov. 2, 2020, which is incorporated by reference herein in their entirety.

TECHNICAL FIELD

This application relates to the communications field, and more specifically, to a wireless communications system, method, and device.

BACKGROUND

Rapid growth in computing technology is creating a greater demand for data communication. The increasing demand in turn drives further growth in communication technology, including multi-beam communication or operations. New radio (NR) or 5th generation (5G) communication system supports uplink power control on uplink physical uplink control channel (PUSCH) transmission and sounding reference signal (SRS) transmission. Pathloss of transmission can be estimated based on measuring a downlink reference signal. For example, a channel-state information reference signal (CSI-RS) or a Synchronization Signal/Physical Broadcast Channel (SS/PBCH) block can be configured as pathloss reference signal.

For each physical uplink control channel (PUCCH) resource, a Radio Resource Control (RRC) parameter can be used to provide (i) one reference signal to provide spatial relation information and (ii) one downlink reference signal to provide path loss reference signal for that PUCCH resource. However, when a beam failure occurs, there would be no reference signal available and thus there is no mechanism to recover the transmission beam of uplink channels. Therefore, it is advantageous to have improved methods or systems to address the foregoing issue.

SUMMARY

The present disclosure provides methods and systems for beam determination for a PUCCH transmission, in response to detecting a beam failure event. The present methods can be implemented by a user equipment (UE). The methods include, for example, (1) upon detecting beam failure of a serving cell, starting a contention-based random-access channel (RACH); (2) transmitting a medium access control (MAC) control element (CE); (3) determining completion of the contention-based RACH based on receipt of a physical downlink control channel (PDCCH); and (4) after receiving one or more of the last symbols of the PDCCH, determining a default transmission (Tx) beam for each resource of a PUCCH that includes a PUCCH spatial relation information parameter.

In some embodiments, the MAC CE signals the beam failure of the serving cell in a message of the contention-based RACH. In some embodiments, the default transmission beam matches a spatial-domain filter used in the latest physical RACH (PRACH) transmission.

The methods can further include determining, after receiving one or more of the last symbols of the PDCCH, one or more power control parameters. The power control parameters includes a reference signal (RS) resource index for uplink, "$q_u$," an RS resource index for downlink, "$q_d$," and/or a PUCCH power control adjustment state, "I." In some embodiments, the RS resource index for uplink "$q_u$" can be set to "0." The RS resource index for downlink "$q_d$" can be set to a RS selected for a preamble ("Msg1") transmission in the PRACH "$q_{new}$." The PUCCH power control adjustment state "I" can be set to "0."

The methods can further include receiving, from a next-generation node B base station (gNB), one or more PUCCH resources. One or more of the PUCCH resources can include the PUCCH spatial relation information parameter.

Another aspect of the present disclosure includes a UE configured to (1) start a contention-based RACH upon detecting beam failure of a serving cell; (2) transmit a MAC CE (the MAC CE signals the beam failure of the serving cell in a message of the contention-based RACH); (3) determine completion of the contention-based RACH based on receipt of a PDCCH; and (4) after receiving one or more of the last symbols of the PDCCH, determine a default transmission beam for each resource of a PUCCH that includes a PUCCH spatial relation information parameter.

In some embodiment, the present method can be implemented by a tangible, non-transitory, computer-readable medium having processor instructions stored thereon that, when executed by one or more processors, cause the one or more processors to perform one or more aspects/features of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIG. 2 is a flowchart of a method in accordance with one or more implementations of the present disclosure.

FIG. 3 is a flowchart of a method in accordance with one or more implementations of the present disclosure.

DETAILED DESCRIPTION

Figure 1:
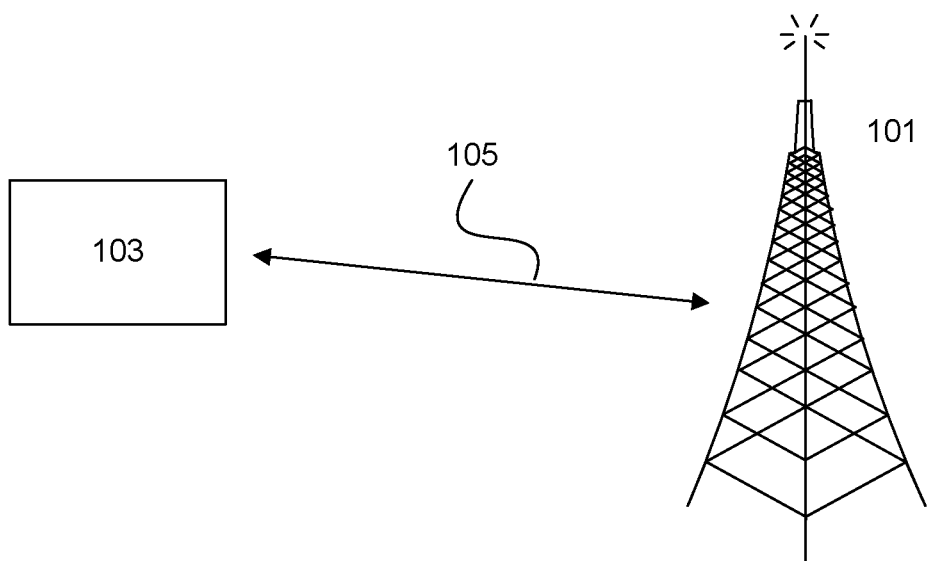
FIG. 1 is a schematic diagram of a wireless communication system in accordance with one or more implementations of the present disclosure.

FIG. 1 illustrates a wireless communications system 100 for implementing the present technology. As shown in FIG. 1, the wireless communications system 100 can include a network device (or base station) 101. Examples of the network device 101 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 101 can include a relay station, an access point, an in-vehicle device, a wearable device, and the like. The network device 100 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as a new radio (New Radio, NR) system or network.

In FIG. 1, the wireless communications system 100 also includes a terminal device 103. The terminal device 103 can be an end-user device configured to facilitate wireless communication. The terminal device 103 can be configured to wirelessly connect to the network device 101 (via, e.g., via a wireless channel 105) according to one or more corresponding communication protocols/standards. The terminal device 103 may be mobile or fixed. The terminal device 103 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 103 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 1 illustrates only one network device 101 and one terminal device 103 in the wireless communications system 100. However, in some instances, the wireless communications system 100 can include additional network device 101 and/or terminal device 103.

The terminal device 103 is configured to start a contention-based RACH upon detecting beam failure of a serving cell. The terminal device 103 is further configured to transmit a MAC CE, which signals the beam failure of the serving cell in a message of the contention-based RACH. The terminal device 103 then determines completion of the contention-based RACH based on receipt of a PDCCH. After receiving one or more of the last symbols of the PDCCH, The terminal device 103 then determines a default transmission (Tx) beam for each resource of a PUCCH that includes a PUCCH spatial relation information parameter.

In some embodiments, the contention-based RACH can be a "4-step" process or a "2-step" process. In some embodiments, the beam failure can be detected by a "beam failure recovery" or "link recovery" process. In some embodiments, the serving cell can be either a primary cell (PCell) or a secondary cell (SpCell or PSCell). In some embodiments, the message of the contention-based RACH ca be a scheduled PUSCH Tx (e.g., "Msg3"). In some embodiments, the message of the contention-based RACH is a single message (e.g., "MsgA"). The single message "MsgA" includes a preamble (e.g., "Msg1") and a scheduled PUSCH Tx (e.g., "Msg3").

For example, in a contention-based RACH-based PCell/PSCell beam failure recovery process, if "Msg3" or "MsgA" of the contention-based RACH contains an MAC CE for beam failure recovery, the terminal device 103 can transmit a PUCCH in the PCell/PSCell with a same spatial domain filter used for the latest PRACH transmission. By this arrangement, the terminal device 103 can determine the default transmission beam for each resource of the PUCCH.

In some embodiments, the terminal device 103 is further configured to determine, after receiving one or more of the last symbols of the PDCCH, one or more power control parameters. For example, after receiving "K" (e.g., 28) symbols from the last symbol of the PDCCH, the terminal device 103 can determine that the contention-based RACH based beam failure recovery is complete. Details of the contention-based RACH based beam failure recovery are described in 3GPP TS 38.321, Clause 5.1.5, which is incorporated by reference herein in its entirety.

In some embodiments, the terminal device 103 is further configured to determine, after receiving one or more of the last symbols of the PDCCH, one or more power control parameters. In some embodiments, the power control parameters include a RS resource index for uplink, $q_u$, an RS resource index for downlink, $q_d$, and/or a PUCCH power control adjustment state, "I."

In some embodiments, the RS resource index for uplink "$q_u$" can be set as "0," the RS resource index for downlink "$q_d$" can be set as "$q_{new}$," which is the RS (e.g., CSI-RS resource or SS/PBCH block) selected for the preamble "Msg1" transmission in the PRACH, and the PUCCH power control adjustment state "I" can be set as "0."

In some embodiments, the terminal device 103 is further configured to receive, from a gNB, one or more PUCCH resources. One or more of the PUCCH resources includes the PUCCH spatial relation information parameter.

FIG. 2 is a flowchart of a method 200 in accordance with one or more implementations of the present disclosure. The method 200 can be implemented by a terminal device or UE (e.g., the terminal device 103). The method 200 is for beam determination for a PUCCH transmission, in response to detecting a beam failure event.

At block 201, the method 200 includes upon detecting beam failure of a serving cell, starting a contention-based RACH. At block 203, the method 200 includes transmitting an MAC CE. At block 205, the method 200 continuers by determining completion of the contention-based RACH based on receipt of a PDCCH. At block 207, the method 200 continuers by determining, after receiving one or more of the last symbols of the PDCCH, a default transmission beam for each resource of a PUCCH that includes a PUCCH spatial relation information parameter.

In some embodiments, the MAC CE signals the beam failure of the serving cell in a message of the contention-based RACH. In some embodiments, the default transmission beam matches a spatial-domain filter used in the latest PRACH transmission.

The method 200 can include determining, after receiving one or more of the last symbols of the PDCCH, one or more power control parameters. The power control parameters comprise an RS resource index for uplink, "$q_u$," an RS resource index for downlink, "$q_d$," and/or a PUCCH power control adjustment state, "I." In some embodiments, the RS resource index for uplink "$q_u$" can be set to "0." The RS resource index for downlink "$q_d$" can be set to a RS selected for a preamble ("Msg1") transmission in the PRACH "$q_{new}$." The PUCCH power control adjustment state "I" can be set to "0."

The methods can further include receiving, from a next-generation node B base station (gNB), one or more PUCCH resources. One or more of the PUCCH resources can include the PUCCH spatial relation information parameter.

In some embodiments, the serving cell can be either a primary cell or a primary secondary cell. In some embodiments, the message of the contention-based RACH can be a scheduled PUSCH transmission (e.g., "Msg3"). In some embodiments, the message of the contention-based RACH is a single message (e.g., "MsgA"). The "MsgA" can include a preamble (e.g., "Msg1") and a scheduled PUSCH transmission (e.g., "Msg3").

FIG. 3 is a flowchart of a method in accordance with one or more implementations of the present disclosure. The method 300 can be implemented by a base station (e.g., a gNB, the network device 101, etc.), a terminal device or UE (e.g., the terminal device 103), etc. The method 300 is for beam determination for a PUCCH transmission, in response to detecting a beam failure event.

At block 301, the method 300 includes a gNB configures "K" PUCCH resources to a UE. Each PUCCH resource is provided with a parameter "PUCCH-SpatialRelationInfo." The parameter "PUCCH-SpatialRelationInfo" is for the UE to determine how to determine beams for PUCCH transmissions.

At block 303, the method 300 includes configuring the UE operate a beam failure recovery process on a PCell or PScell. At block 305, the UE detects beam failure on the PCell or PScell and then initiates a contention-based RACH to transmit a MAC CE for beam failure. The MAC CE for beam failure is in "Msg3" or "MsgA" of the contention-based RACH.

At block 305, the UE uses a first PDCCH reception to determine the completion of the contention-based RACH based beam failure recovery process. At decision block 309, the UE determines if the PUCCH is configured with the parameter "PUCCH-SpatialRelationInfo." If negative, the method 300 goes back to previous step block 307. If positive, the method 300 moves to block 311. At block 311, after "K" symbols from the last symbols of the first PDCCH reception, the UE determines a "default" transmission beam and power control parameters for that PUCCH resource.

In some embodiments, the "default" transmission beam can be the same as the spatial domain filter used for the latest PRACH transmission. The power control parameters can be "$q_u$=0," "$q_d$=$q_{new}$," and "I=0." The parameter "$q_{new}$" can be the SS/PBCH block or CSI-RS resource index that was selected for the last PRACH transmission.

In other embodiments, the UE can transmit a first PUSCH MAC CE providing an index for the PCell or the PSCell with a radio link quality (which can be lower than a threshold "$Q_{out}$, LR"). The first PUSCH can be scheduled by a Random Access Response (RAR) UL grant. After "K" (e.g., 28) symbols from the last symbol of the PDCCH reception addressed to Cell Radio Network Temporary Identifier (C-RNTI) that is used to consider successful contention resolution as described in Clause 5.1.5 and Clause 5.1.4a of 3GPP TS 38.321. If a PUCCH resource is provided with the parameter "PUCCH-SpatialRelationInfo," the UE can transmit the PUCCH on the same cell as used by the PRACH transmission.

In such embodiments, the power control parameters can be "$q_u$=0," "$q_d$=$q_{new}$," and "I=0." The parameter "$q_{new}$" can be the SS/PBCH block or CSI-RS resource index that was selected for the last PRACH transmission.

Figure 4:
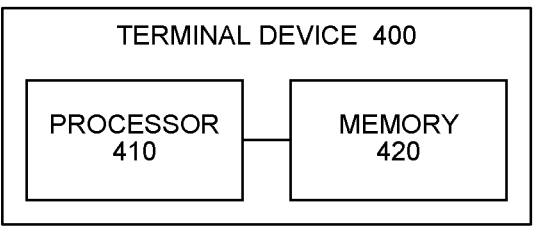
FIG. 4 is a schematic block diagram of a terminal device in accordance with one or more implementations of the present disclosure.

FIG. 4 is a schematic block diagram of a terminal device 400 (e.g., an example of the terminal device 103 of FIG. 1) in accordance with one or more implementations of the present disclosure. As shown in FIG. 4, the terminal device 400 includes a processing unit 410 (e.g., a DSP, a CPU, a GPU, etc.) and a memory 420. The processing unit 410 can be configured to implement instructions that correspond to the method 200 of FIG. 2 and the method 300 of FIG. 3 and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method, executable by a user equipment (UE), the method comprising:

upon detecting beam failure of a serving cell, starting a contention-based random-access channel (RACH);

transmitting a medium access control (MAC) control element (CE), wherein the MAC CE signals the beam failure of the serving cell in a message of the contention-based RACH;

determining completion of the contention-based RACH based on receipt of a physical downlink control channel (PDCCH);

determining whether each resource of a physical uplink control channel (PUCCH) is configured with a PUCCH spatial relation information parameter, and when determining that the resource of the PUCCH is configured with the PUCCH spatial relation information parameter, after receiving one or more of the last symbols of the PDCCH, determining a default transmission (Tx) beam for the resource of the PUCCH that includes the PUCCH spatial relation information parameter.

2. The method of claim 1, wherein the default Tx beam matches a spatial-domain filter used in the latest physical RACH (PRACH) transmission.

3. The method of claim 1, further comprising:

determining, after receiving one or more of the last symbols of the PDCCH, one or more power control parameters.

4. The method of claim 3, wherein the power control parameters comprise a reference signal (RS) resource index for uplink, $q_u$, an RS resource index for downlink, $q_d$, and/or a PUCCH power control adjustment state, I.

5. The method of claim 4, further comprising setting $q_u$ to 0.

6. The method of claim 4, further comprising setting $q_d$ to a RS selected for a preamble (Msg1) Tx in the PRACH, $q_{new}$.

7. The method of claim 4, further comprising setting I to 0.

8. The method of claim 1, further comprising:

receiving, from a next-generation node B base station (gNB), one or more PUCCH resources, wherein one or more of the PUCCH resources includes the PUCCH spatial relation information parameter.

9. The method of claim 1, wherein the serving cell is either a primary cell (PCell) or a primary secondary cell (PSCell).

10. The method of claim 1, wherein the message of the contention-based RACH is a scheduled physical uplink shared channel (PUSCH) Tx (Msg3).

11. The method of claim 1, wherein the message of the contention-based RACH is a single message (MsgA), wherein MsgA comprises a preamble (Msg1) and a scheduled PUSCH Tx (Msg3).

12. A user equipment (UE), comprising a processor and a memory, wherein the processor is configured to cause the UE to:

start a contention-based random-access channel (RACH) upon detecting beam failure of a serving cell;

transmit a medium access control (MAC) control element (CE), wherein the MAC CE signals the beam failure of the serving cell in a message of the contention-based RACH;

determine completion of the contention-based RACH based on receipt of a physical downlink control channel (PDCCH);

determine whether each resource of a physical uplink control channel (PUCCH) is configured with a PUCCH spatial relation information parameter, and when determining that the resource of the PUCCH is configured with the PUCCH spatial relation information parameter, after receiving one or more of the last symbols of the PDCCH, determine a default Tx beam for the resource of the PUCCH that includes the PUCCH spatial relation information parameter.

13. The UE of claim 12, wherein the default Tx beam matches a spatial-domain filter used in the latest physical RACH (PRACH) transmission.

14. The UE of claim 12, wherein the processor is further configured to cause the UE to:

determine, after receiving one or more of the last symbols of the PDCCH, one or more power control parameters.

15. The UE of claim 14, wherein the power control parameters comprise a reference signal (RS) resource index for uplink, $q_u$, an RS resource index for downlink, $q_d$, and/or a PUCCH power control adjustment state, I.

16. The UE of claim 15, wherein the processor is further configured to cause the UE to set $q_u$ to 0.

17. The UE of claim 15, wherein the processor is further configured to cause the UE to set $q_d$ to a RS selected for a preamble (Msg1) Tx in the PRACH, $q_{new}$.

18. The UE of claim 15, wherein the processor is further configured to cause the UE to set I to 0.

19. The UE of claim 12, wherein the processor is further configured to cause the UE to:

receive, from a next-generation node B base station (gNB), one or more PUCCH resources, wherein one or more of the PUCCH resources includes the PUCCH spatial relation information parameter.

20. The UE of claim 12, wherein the serving cell is either a primary cell (PCell) or a primary secondary cell (PSCell), wherein the message of the contention-based RACH is a scheduled physical uplink shared channel (PUSCH) Tx (Msg3); or the message of the contention-based RACH is a single message (MsgA), wherein MsgA comprises a preamble (Msg1) and a scheduled PUSCH Tx (Msg3).

* * * * *